(12) United States Patent
Wang et al.

(10) Patent No.: US 10,484,208 B2
(45) Date of Patent: Nov. 19, 2019

(54) ANOMALIES DETECTION SYSTEM AND METHOD FOR STRUCTURE

(71) Applicant: WISTRON NEWEB CORPORATION, Hsinchu (TW)

(72) Inventors: Chia-Hsiang Wang, Hsinchu (TW); Horen Chen, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 23 days.

(21) Appl. No.: 15/903,101

(22) Filed: Feb. 23, 2018

(65) Prior Publication Data

US 2019/0268183 A1 Aug. 29, 2019

(51) Int. Cl.
*H04L 25/02* (2006.01)
*H04W 24/10* (2009.01)
*H04B 7/06* (2006.01)
*H04L 5/00* (2006.01)

(52) U.S. Cl.
CPC ....... *H04L 25/0224* (2013.01); *H04B 7/0626* (2013.01); *H04W 24/10* (2013.01); *H04L 5/0048* (2013.01)

(58) Field of Classification Search
None
See application file for complete search history.

(56) References Cited

U.S. PATENT DOCUMENTS

| 7,937,248 | B2 | 5/2011 | Ihn et al. |
| 2003/0138053 | A1 | 7/2003 | Candy et al. |
| 2013/0279561 | A1* | 10/2013 | Jin ............ H04L 25/4902 375/239 |
| 2017/0188359 | A1* | 6/2017 | Liu ............ H04W 72/0446 |
| 2017/0212210 | A1* | 7/2017 | Chen ............ G01S 5/06 |
| 2018/0365975 | A1* | 12/2018 | Xu ............ G01S 13/04 |

OTHER PUBLICATIONS

Kaishun Wu, et al., "CSI-based Indoor Localization", IEEE Transactions on Parallel and Distributed Systems ( vol. 24, Issue: 7, Jul. 2013 ).
Chen Chen, et al., "Indoor Global Positioning System with Centimeter Accuracy Using Wi-Fi", IEEE Signal Processing Magazine, Nov. 2016, 1053-5888/16 © 2016IEEE.

* cited by examiner

*Primary Examiner* — Peter Chen
(74) *Attorney, Agent, or Firm* — Li & Cai Intellectual Property (USA) Office (57) ABSTRACT

A structure detection system and method for detecting anomalies associated with the structure are provided. The system includes a first transceiver, a second transceiver, and a processor. In a first TR test, the second transceiver receives a first probing signal sent from the first transceiver and performs a time-reversal (TR) process to generate a first TR signal to be sent to the first transceiver, and a first channel state information (CSI) is obtained in response to the first TR signal. In a second TR test, the first transceiver receives a second probing signal sent from the second transceiver and performs the TR process to generate a second TR signal to be sent to the second transceiver, a second CSI is obtained in response to the second TR signal. The processor compares a combination of the first CSI and the second CSI to a reference CSI for detecting anomalies.

15 Claims, 10 Drawing Sheets

FIG. 5C

ANOMALIES DETECTION SYSTEM AND METHOD FOR STRUCTURE

BACKGROUND OF THE INVENTION

1. Field of the Invention

The present disclosure relates to a structure detection system and method, and in particular, to a structure detection system and method that detect anomalies associated with the structure by obtaining channel state information (CSI) from the time-reversal process.

2. Description of Related Art

Advanced structural health monitoring (SHM) techniques provide accurate assessment of structure condition and, through the promotion of proper maintenance, can reduce the cost of unnecessary structure replacement. Sensors, such as electromagnetic acoustic transducers, magnetic sensors, laser ultrasonics, infrared or thermal cameras, guided waves, field measurement probes, and strain gauges have been adopted to measure structural information, including static and dynamic displacement, strain and stress, acceleration, surface and interior damage, and corrosion. Due to the sheer size of most bridge structures, these SHM techniques may be cost prohibitive.

Accordingly, there is a need for a structure detection method based on time-reversal technology that can have a nation-wide impact by being practical, scalable, cost-effective, and capable of integration into system-wide implementation.

SUMMARY OF THE INVENTION

According to an embodiment of the present disclosure, there is provided a structure detection system including a first transceiver, a second transceiver and a processor. The second transceiver communicates with the first transceiver to detect a structure. In a first TR test, the first transceiver is configured to send a first probing signal, the second transceiver is configured to receive the first probing signal and to perform a time-reversal (TR) process to generate a first TR signal to be sent to the first transceiver, and the first transceiver is configured to obtain a first channel state information (CSI) in response to the first TR signal. In a second TR test, the second transceiver is configured to send a second probing signal, the first transceiver is configured to receive the first probing signal and to perform the TR process to generate a second TR signal to be sent to the second transceiver, and the second transceiver is configured to obtain a second CSI in response to the second TR signal. The processor is configured to compare a combination of the first CSI and the second CSI to a reference CSI for detecting anomalies associated with the structure.

According to another embodiment of the present disclosure, there is provided a structure detection method, including: communicating a first transceiver with a second transceiver to detect a structure; configuring the first transceiver and the second transceiver to perform a first time-reversal (TR) test, wherein in a first TR test, the first transceiver is configured to send a first probing signal, the second transceiver is configured to receive the first probing signal and to perform a time-reversal (TR) process to generate a first TR signal to be sent to the first transceiver, and the first transceiver is configured to obtain a first channel state information (CSI) in response to the first TR signal; configuring the first transceiver and the second transceiver to perform a second TR test, in which the second transceiver is configured to send a second probing signal, the first transceiver is configured to receive the first probing signal and to perform the TR process to generate a second TR signal to be sent to the second transceiver, and the second transceiver is configured to obtain a second CSI in response to the second TR signal; and configuring a processor to execute a detection monitoring algorithm to compare a combination of the first CSI and the second CSI to a reference CSI for detecting anomalies associated with the structure.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the disclosure are set forth in the appended claims. The disclosure itself, however, as well as modes of use, further objectives and advantages thereof, will best be understood with reference to the following detailed description of exemplary embodiments of the present disclosure when read in conjunction with the accompanying drawings, wherein:

DETAILED DESCRIPTION OF THE PREFERRED EMBODIMENTS

Figure 1A:
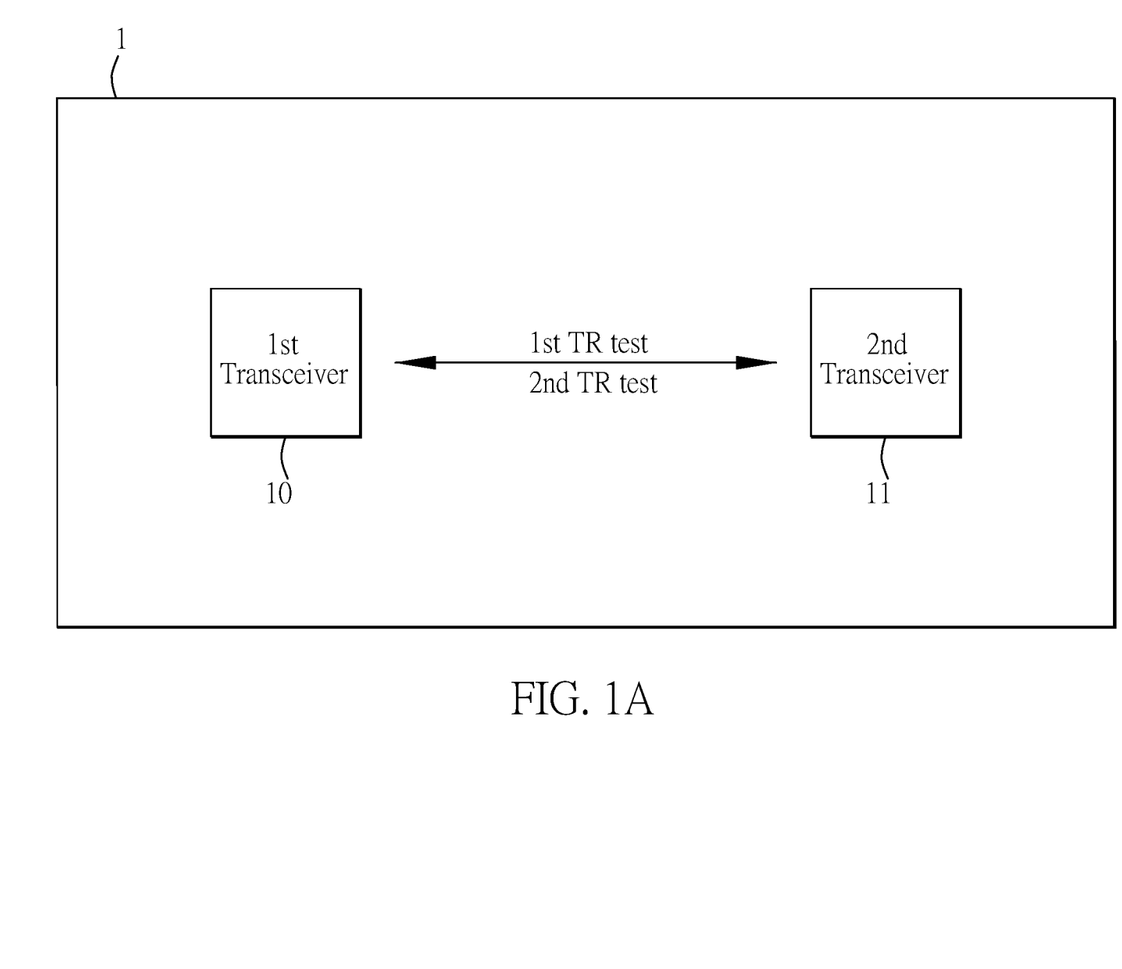
FIG. 1A shows a diagram of a structure detection system according to an embodiment of the present disclosure.
Figure 1B:
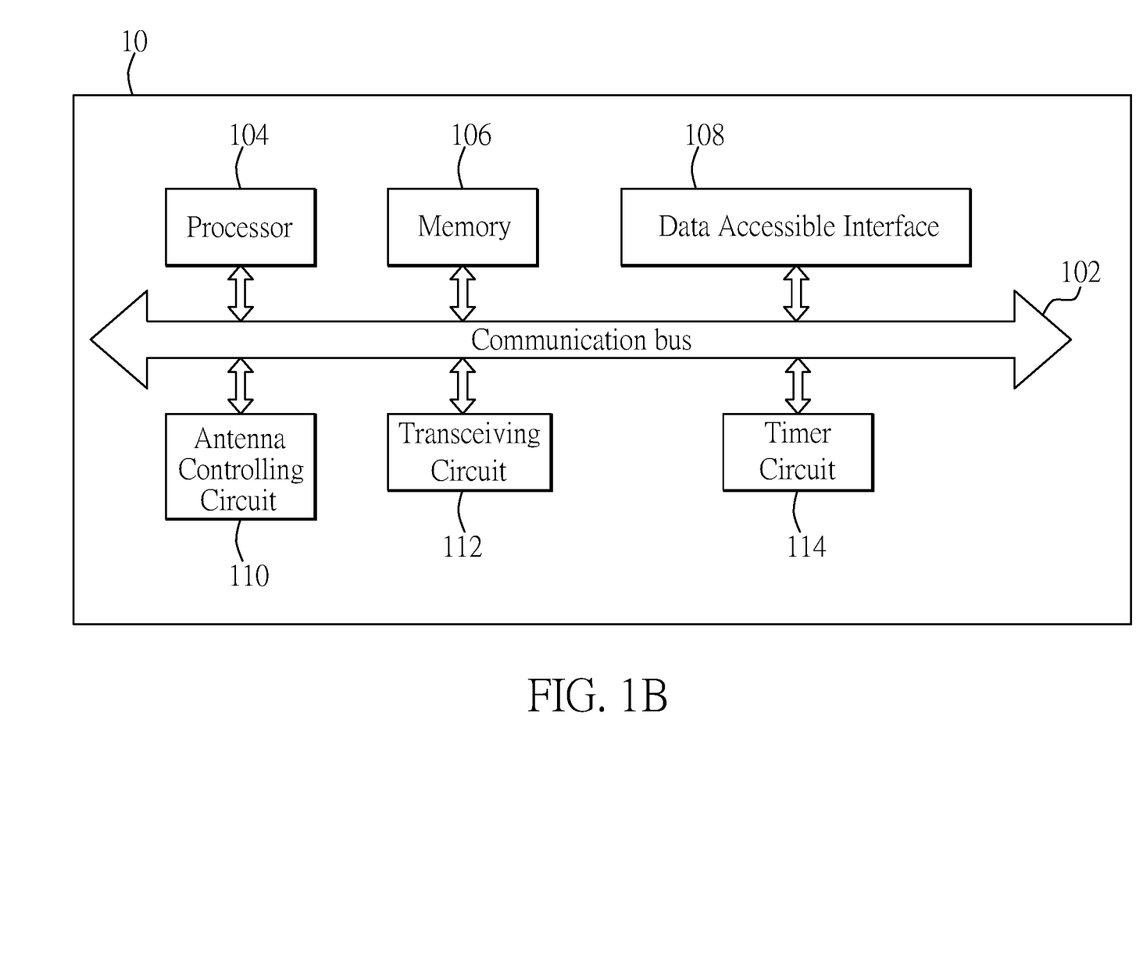
FIG. 1B shows a diagram of the first transceiver in accordance with an exemplary embodiment.

Referring more particularly to the drawings, embodiments of the disclosure may be described in the context of the structure detection system as shown in FIGS. 1A and 1B.

As shown in FIG. 1A, a diagram of a structure detection system is depicted in accordance with an exemplary embodiment. The structure detection system 1 may be implemented in any type of computing device. In this embodiment, the structure detection system 1 may include a first transceiver 10 and a second transceiver 11 for analyzing time reversal responses to detect structural health and test for anomalies associated with structures. The second transceiver 11 may be configured to be as the same as the first transceiver 10, and a processor provided in at least one of the first transceiver 10 and second transceiver 11 may be configured to perform TR tests to obtain CSIs, the detailed description will be provided hereinafter.

FIG. 1B provides a diagram of the first transceiver in accordance with an exemplary embodiment. In an illustrative example of the embodiment, the first transceiver 10 includes a communications bus 102, which provides communications between a processor 104, a memory 106, a data accessible interface 108, an antenna controlling circuit 110, a transceiving circuit 112, and a timer circuit 114.

The processor 104 serves to execute instructions for software or firmware that may be loaded into the memory 106. The processor 104 may be a set of one or more processors or may be a multi-processor core, depending on the particular implementation. Further, the processor 104 may be implemented using one or more heterogeneous processor systems in which a main processor is present with secondary processors on a single chip. As another illustrative example of the embodiment, the processor 104 may be a symmetric multiprocessor system containing multiple processors of the same type.

The memory 106, in these examples, may be a random access memory. The memory 106 may take various forms depending on the particular implementation. For example, the memory 106 may contain one or more components or devices. For example, the memory 106 may be a hard drive, a flash memory, a rewritable optical disk, a rewritable magnetic tape, or any combination thereof. The media used by the memory 106 also may be removable. For example, a removable hard drive may be used as the media for the memory 106.

In this embodiment, the transceiving circuit 112 may include an antenna, launches a wireless signal that propagates through a wireless channel and arrives at the second transceiver 12 as a multipath wireless signal. A smart antenna may be implemented in this embodiment and the smart antenna has antenna array supporting directional or omnidirectional radiation patterns. In certain embodiments, the transmitting and receiving antennas may be arranged apart from each other, and in certain other embodiments, they may be co-located. For example, a device, computer, mobile device, access point and the like may include more than one antenna, and the antennas may be operated as either or both transmit and receive antennas. Furthermore, the transceiving circuit 112 may be examples of transmitters and sensors that may be implemented in the first transceiver 10 to transmit signals and detect responses to said signals. In some embodiments, the antennas of the transceiving circuit 112 may be single antenna that may be used to both launch wireless signals into a channel and to receive multipath signals from the channel. Furthermore, the transceiving circuit 112 may also include radio frequency (RF) circuit(s), intermediate frequency (IF) circuit(s) and baseband circuit(s).

The antenna controlling circuit 110 may be configured to control the antenna of the transceiving circuit 112 to transmit/receive signals in different frequency bands, in different directions, and/or in different polarizations, in the same or similar frequency bands, in the same or similar directions, and/or in the same or similar polarizations. In some embodiments, the antenna controlling circuit 110 may adjust carrier frequency, direction and/or polarization of signal transmissions and signal receptions. The antenna controlling circuit 110 can be configured to adjust the transceiving circuit 112 to be comply with the IEEE 802.11 standard. The IEEE 802.11 standard can include at least one of IEEE 802.11a, IEEE 802.11b, IEEE 802.11g, IEEE 802.11n, IEEE 802.11ac, or IEEE 802.11ad standards.

The timer circuit 114 includes a timer for timing a period of time, such that the processor 104 may control the trigger sequence of the transceiving circuit 112. In other embodiments, the processor 104 may control the antennas of the transceiving circuit 112 to transmit and receive signals in different time slots, or to transmit and receive signals at the same or similar times.

Instructions for the structure detection system and applications or programs are stored in the memory 106, for example, a detection algorithm. These instructions may be loaded into the memory 106 for execution by the processor 104. The processes of the different embodiments may be performed by the processor 104 using computer implemented instructions, which may be stored in a memory, such as the memory 106. These instructions are referred to as computer usable program code or computer readable program code that may be read and executed by a processor in the processor 104.

The computer readable program code may be embodied on different physical or tangible computer readable media, such as the memory 106.

The computer usable program codes exist in a functional form on a computer readable media and may be loaded onto or transferred to the memory 106. In one example, the computer readable media may be, for example, an optical or magnetic disc that is inserted or placed into a drive or other devices that are part of the memory 106 for transfer onto a storage device, such as a hard drive that is part of the memory 106. The computer readable media also may take the form of a persistent storage, such as a hard drive or a flash memory that is connected to the processor 104 via the communication bus 102. The detection algorithm, communication parameters, reference CSIs, current CSIs associated with the detections may be stored in the memory 106.

The data accessible interface 108, in these examples, may be provided for user to access data stored in the memory 106. In certain embodiment, the data may include the detection algorithm, communication parameters, reference CSIs, and current CSIs associated with the detections, those may be manually accessed by the user for analyzing time reversal responses to detect structural health and test for anomalies associated with structures, if one or more components are failed in the system.

The different components illustrated for the structure detection system 100 are not meant to provide architectural limitations to the manner in which different embodiments may be implemented. The different illustrative embodiments may be implemented in the structure detection system including components in addition to or in place of those illustrated for the structure detection system 100. Other components shown in FIG. 1B can be varied from the illustrative examples shown.

Figure 1C:
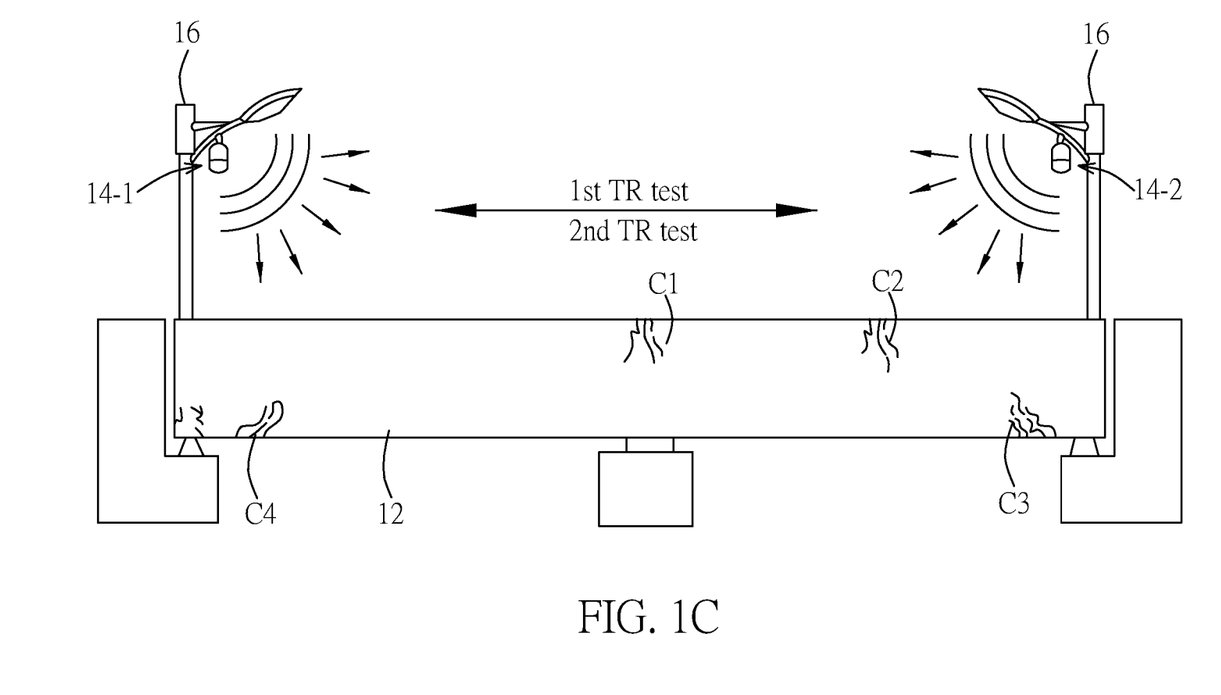
FIG. 1C shows a schematic diagram of the structure detection system according to an embodiment of the present disclosure.

In FIG. 1C, a schematic diagram of the structure detection system is further depicted in accordance with an exemplary embodiment. As shown in FIG. 1C, a structure 12, such as a bridge, is provided with a first transceiver, i.e., a first CSI access point (AP) 14-1 and a second transceiver, i.e., a second CSI AP 14-2.

Each of the first CSI AP 14-1 and the second CSI AP 14-2 may further include the processor 104, the memory 106, the antenna controlling circuit 110, the transceiving circuit 112, and the timer circuit 114 mentioned above, specifically, the processor 104 may be provided in the first CSI AP 14-1 or the second CSI AP 14-2. In these examples, the first CSI AP 14-1 and the second CSI AP 14-2 in the system are disposed in particular regions in the structure 12. The structure 12 may include cracks C1, C2, C3 and C4 which may exist in regions where compression and tension forces are concentrated. The cracks C1, C2, C3 and C4 may be caused by externally applied loads, or may occur independent of loading conditions. Cracks independent of the loading conditions include plastic shrinkage cracks, settlement cracks, drying shrinkage cracks, thermal cracks, and map or pattern cracks. The cracks C1, C2, C3 and C4 may also have different orientations.

In an embodiment, the structure 12 may be a bridge provided with a plurality of roadway lights 16. For example, the first CSI AP 14-1 and the second CSI AP 14-2 may be disposed at positions adjacent to the roadway lights 16 in order to share electrical power. In these examples, positions of the transceiving circuits 112 are fixed in place once the first CSI AP 14-1 and the second CSI AP 14-2 are placed. Specifically, the second CSI AP 14-2 communicates with the first CSI AP 14-1 to detect the structure 12. The different CSI APs within the structure detection system 100 are configured to be capable of monitoring one or more areas within the structure 12. These areas may be selected based on different factors, such as risk areas where damage may cause an anomalous condition within the structure.

The structure detection system utilizes scattered waves caused by sending the test signal through the cracks in the structure. That is, the system obtains the channel state information (CSI) after the test signal is processed by the time-reversal (TR) method to determine whether a crack exists and to estimate the approximate position of the crack. CSI is information that can represent the channel properties of a communication link to thereby estimate the channel. More specifically, CSI describes how a signal propagates from the transmitter(s) to the receiver(s) and reveals the combined effect of, for instance, scattering, fading, and power decay with distance.

In detail, during a channel probing phase, the transceiver A sends an impulse to the transceiver B, which produces an estimated CSI for the multipath channel between the transceivers A and B. Then, the corresponding characteristic parameters of CSI is obtained by time-reversing and conjugating the estimated CSI. During a TR transmission phase, the transceiver B transmits back the time-reversed and conjugated CSI and generates a spatial-temporal resonance at the transceiver A by fully collecting and concentrating the energy of the multipath channel. The TR spatial-temporal resonance can be viewed as the resonance of EM field in response to the environment, also known as the TR focusing effect.

When the propagation structure changes, the received multipath profile varies correspondingly. As a consequence, the spatial-temporal resonance at the receiver side changes and can be used to track the cracks in the structure.

Furthermore, similar detection approaches without causing structural damage have been utilized in indoor positioning systems for supporting location-based services in indoor environments. WiFi-based indoor localization has been attractive due to its open access and low cost characteristics. However, the distance estimation based on received signal strength indicator (RSSI) is easily affected by the temporal and spatial variance due to the multipath effect, which contributes to most of the estimation errors in current systems. The literature "CSI-Based Indoor Localization, K. Wu, J. Xiao, Y. Yi, D. Chen, X. Luo and L. M. Ni, in *IEEE Transactions on Parallel and Distributed Systems*, vol. 24, no. 7, pp. 1300-1309, July 2013" describing the advantages of using CSI is hereby incorporated by reference. The reference analyzes this effect across the physical layer and accounts for the undesirable RSSI readings being reported. The context has explored the frequency diversity of the subcarriers in OFDM systems and proposes a novel approach called FILA, which leverages the channel state information (CSI) to build a propagation model and a fingerprinting system at the receiver. The experimental results show that the accuracy and latency of distance calculation can be significantly enhanced by using CSI.

Based on the above principle, the processors 104 provided in the first CSI AP 14-1 and the second CSI AP 14-2 may be configured to control the transceiving circuits 112 to perform a first time-reversal (TR) test and a second TR test by executing instructions for software that may be loaded into each of the memorys 106.

In the first TR test, the first CSI AP 14-1 is configured to send a first probing signal, the second CSI AP 14-2 is configured to receive the first probing signal and to perform a time-reversal (TR) process to generate a first TR signal. After that, the first TR signal is sent to the first CSI AP 14-1, and the first CSI AP 14-1 is configured to obtain a first channel state information (CSI) in response to the first TR signal.

In the second TR test, the second CSI AP 14-2 is configured to send a second probing signal, the first CSI AP 14-1 is configured to receive the second probing signal and to perform the TR process to generate a second TR signal to be sent to the second CSI AP 14-2, and the second CSI AP 14-2 is configured to obtain a second CSI in response to the second TR signal. Since the processor 104 may be provided only in one of the first CSI AP 14-1 and the second CSI AP 14-2, the first CSI AP 14-1 and the second CSI AP 14-2 may be able to communicate with each other through the use of either or both physical and wireless communications links for transmitting the obtained first CSI and second CSI therebetween.

After the first CSI and the second CSI are obtained and stored in the memory 106, the processor 104 is further configured to compare a combination of the first CSI and the second CSI to a reference CSI for detecting anomalies associated with the structure 12. The first CSI and the second CSI are information which describe how signals propagate between the first CSI AP 14-1 and the second CSI AP 14-2. The first CSI, the second CSI and the reference CSI may include channel impulse response, channel frequency response, the number of beams formed, the number of the antennas, package transmit rate, etc.

In an Orthogonal frequency-division multiplexing (OFDM) system, transmissions of signals may be represented by the following equation (1):

$$Y = HX + N \qquad (1)$$

In the above equation, Y and X respectively represent the receive and transmit vectors, and H and N respectively represent the channel matrix and the noise vector. Therefore, the CSI may be estimated with the following equation (2):

$$\tilde{H} = \frac{Y}{X} \qquad (2)$$

In the above equation, $\tilde{H}$ is channel frequency response. The channel frequency response and the channel impulse response may be transformed from each other by applying the Fast Fourier transform (FFT) and the Inverse Fast Fourier transform (IFFT). Each component in CSI can be composed by an amplitude and a phase of a sub-carrier, and when multiple subcarriers arrive at the receiver end along different paths, each sub-carrier may have its own amplitude and phase. Therefore, the CSI matrix may be represented by the following equation (3):

$$H=[H1,H2,H3,\ldots,Hn] \quad (3)$$

In equation (3), Hn means the channel matrix of $n^{th}$ sub-carrier.

In this regard, the first CSI may be represented by the equation (4):

$$H1=[H11,H21,H31,\ldots,Hn1] \quad (4)$$

The second CSI may be represented by the following equation (5):

$$H2=[H12,H22,H32,\ldots Hn2] \quad (5)$$

The reference CSI may be represented by the following equation (6):

$$HS=[\|Havg1\|,\|Havg2\|,\ldots,\|Havgn\|] \quad (6)$$

where $\|Havg1\|$, $\|Havg2\|$, ..., $\|Havgn\|$ are amplitudes of each of the plurality of subcarriers in the reference CSI. Note that the number of sub-carriers of the first CSI should as the same as those of the second CSI and the reference CSI.

Figure 2:
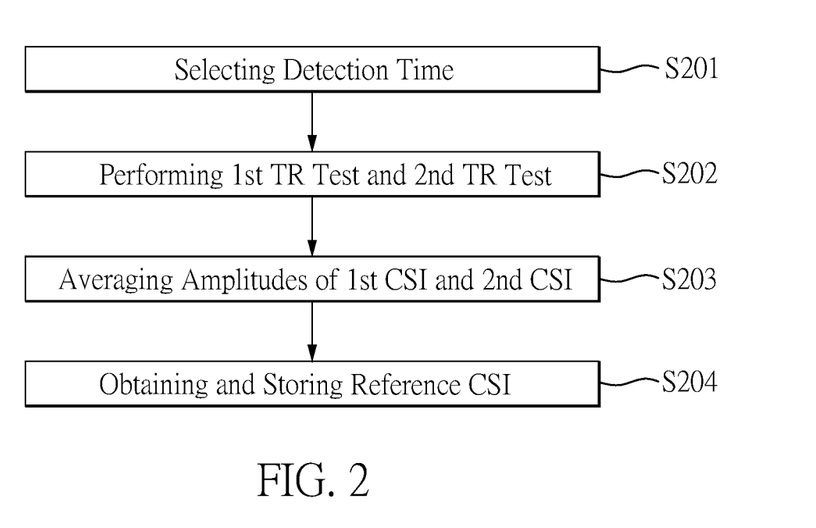
FIG. 2 shows a flow chart for establishing the reference CSI according to an embodiment of the present disclosure.

The reference CSI is a reference for determining the existence of the cracks that may put the bridge at risk or in danger. Therefore, before the reference CSI is obtained, the bridge needs to be confirmed to be crack-free, or to be confirmed that the cracks would not put the bridge at risk. Reference is made to FIG. 2, which shows a flow chart for establishing the reference CSI.

As shown in FIG. 2, in step S201, carefully selecting the detection time. A specific moment in a day with minimum interference for the detection may be considered. For example, one or two hours before the roadway lights 14 are turned off, or 03:00 A.M. to 04:00 A.M. may be selected as the detection time.

In step S202, performing the first TR test and the second TR test as mentioned above to obtain a first reference CSI and a second reference CSI. The first reference CSI and the second reference CSI may be represented by following equations (7) and (8):

$$HS1=[HS11,HS21,HS31,\ldots,HSn1] \quad (7)$$

$$HS2=[HS12,HS22,HS32,\ldots,HSn2] \quad (8)$$

In step S203, averaging the amplitudes of the first reference CSI and the second reference CSI to obtain the reference CSI. The reference CSI may be represented by the following equation (9):

$$HS=[\|Havg1\|,\|Havg2\|,\ldots,\|Havgn\|]=[(\|HS11\|+\|HS12\|)/2,(\|HS21\|+\|HS22\|)/2,(HS31\|+\|HS32\|)/2,\ldots,(\|HSn1\|+\|HSn2\|)/2] \quad (9)$$

In step S204, obtaining and storing the reference CSI in the memory 106 for comparison. The flow for establishing the reference CSI may be executed by the processor 104 in one or each of the first CSI AP 14-1 and the second CSI AP 14-2.

Figure 3:
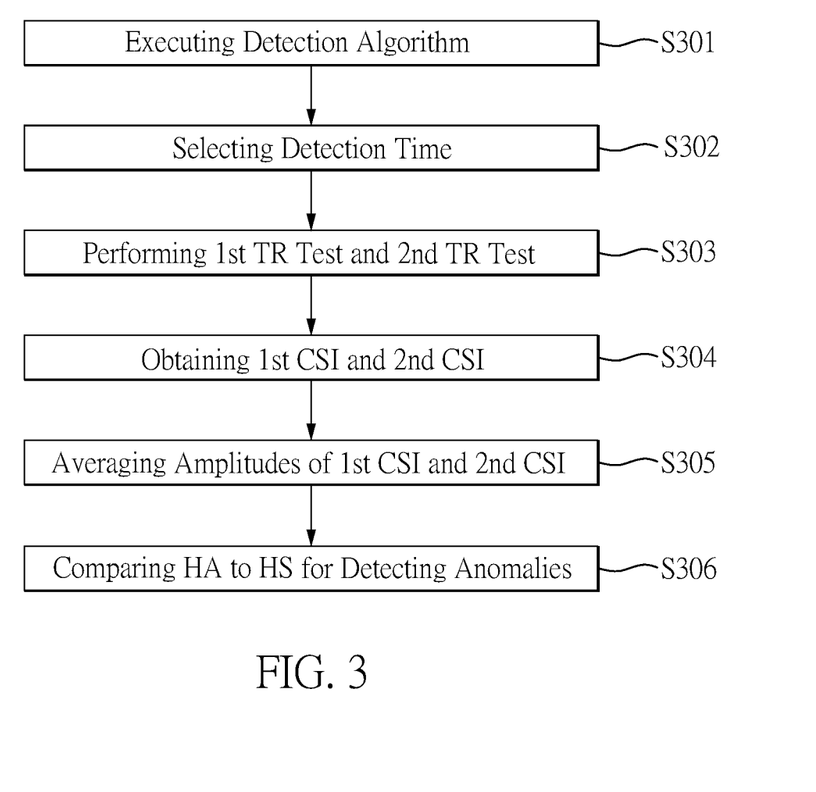
FIG. 3 shows a flow chart of the detection algorithm according to an embodiment of the present disclosure.

In further detail, a detection algorithm may be loaded into the memory 106, and be executed by the processor 104 to perform the comparison between the combination of the first CSI and the second CSI and the reference CSI. A detection time for obtaining the first CSI and the second CSI should also be selected carefully. In consideration of the interference factors for the detection, an operation time of day for obtaining the first CSI and the second CSI should be substantially the same as a test time of day for obtaining the reference CSI. Reference to FIG. 3, which shows a flow chart of the detection algorithm according to an embodiment of the present disclosure.

In step S301, configuring the processor 104 to execute the detection algorithm loaded in the memory 106.

In step S302, selecting the detection time of the first TR test and the second TR test.

In step S303, configuring the processor 104 to control the first CSI AP 14-1 and the second CSI AP 14-2 to perform the first TR test and the second TR test.

In step S304, obtaining the first CSI and the second CSI.

In step S305, averaging the first CSI and the second CSI to obtain a current CSI. The current CSI may be represented by the following equation (10):

$$HA=[(\mu H11\|+\|H12\|)/2,(\|H21\|+\|H22\|)/2,\ldots,(\|Hn1\|+\|Hn2\|)/2] \quad (10)$$

where $\|H11\|$, $\|H21\|$, ..., $\|Hn1\|$ are amplitudes of each of the plurality of subcarriers obtained in the first CSI, and $\|H12\|$, $\|H22\|$, ..., $\|Hn2\|$ are amplitudes of each of the plurality of subcarriers obtained in the second CSI.

In step S306, an average amplitude matrix HA of the first CSI and the second CSI is compared to an average reference amplitude matrix HS of the reference CSI for detecting anomalies associated with the structure. The comparison may be performed according to a result of the following equation (11):

$$\sqrt{\Sigma(HS-HA)^2} \geq \text{Threshold Value} \quad (11)$$

The processor 104 is further configured to determine whether the value of $\sqrt{\Sigma(HS-HA)^2}$ is larger than a threshold value, if yes, an anomaly is determined to exist in the structure 12.

When the calculation result is greater than the threshold value, the safety-threatening crack is determined to exist in the structure. The magnitude of the threshold value must be determined upon the establishment of the reference CSI since the factors of the environment and the lifetime of the bridge should be taken into account.

Figure 4A:
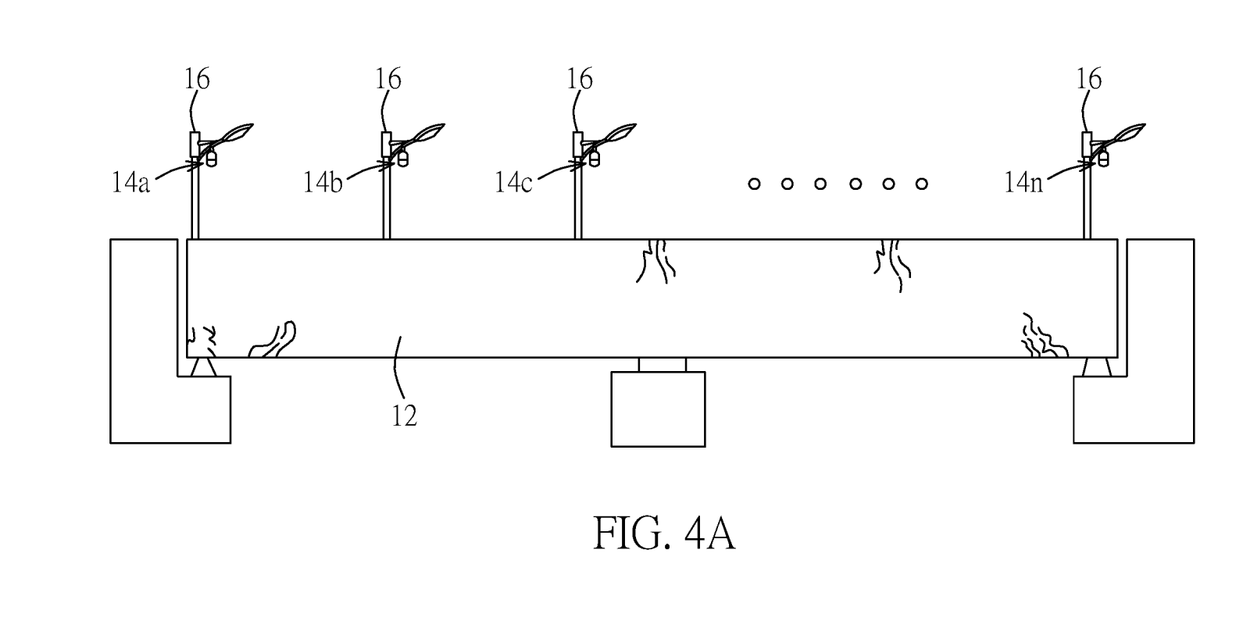
FIG. 4A shows a schematic diagram of the structure detection system according to another embodiment of the present disclosure.
Figure 4B:
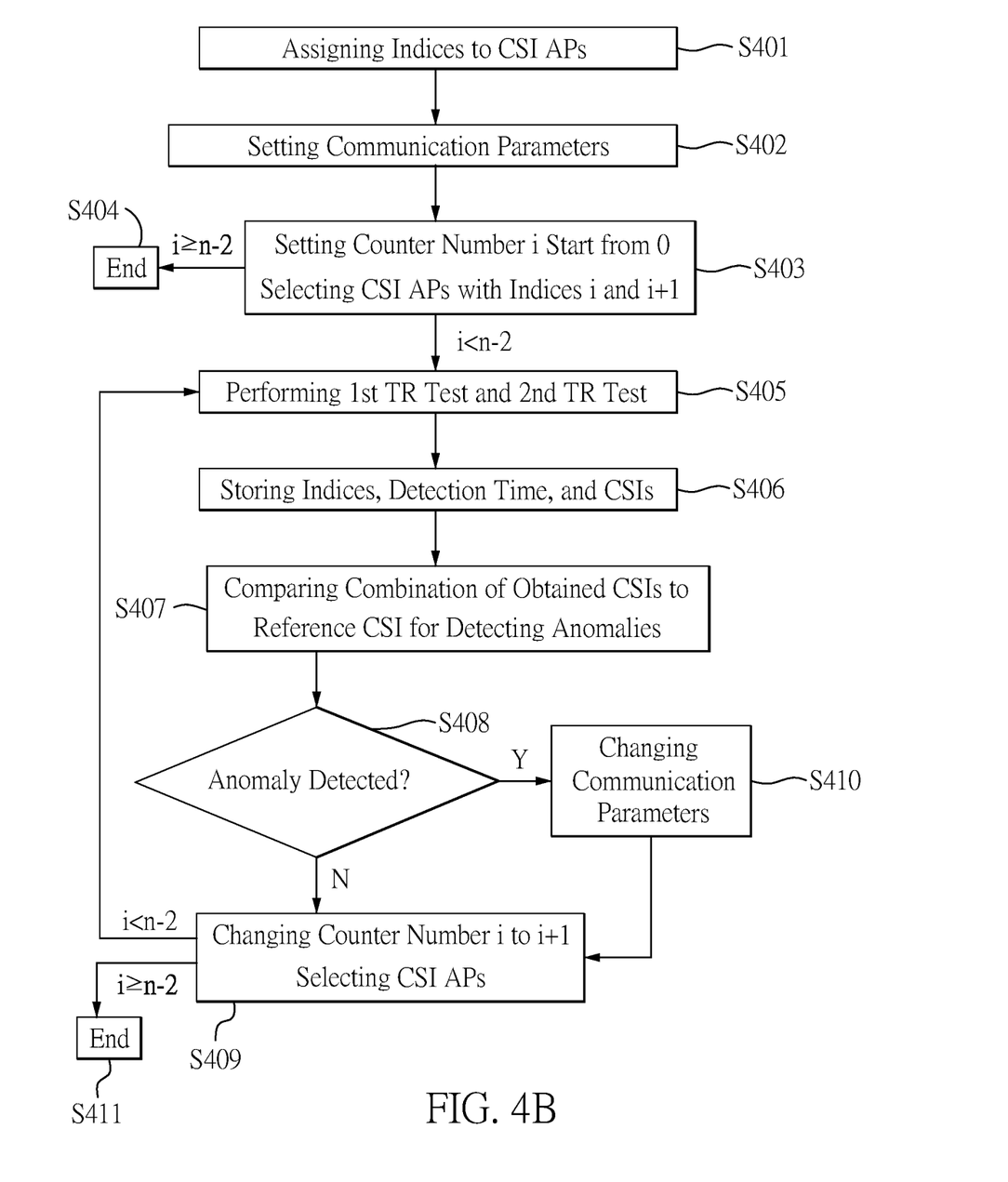
FIG. 4B shows a flow chart of a structure detection method according to an embodiment of the present disclosure.

Reference is made to FIGS. 4A and 4B. In FIG. 4A, a schematic diagram of the structure detection system is further depicted in accordance with another exemplary embodiment, and FIG. 4B shows a flow chart of a structure detection method according to an embodiment of the present disclosure.

As shown in FIG. 4A, a structure 12, such as a bridge, is provided with a plurality of CSI access points (AP) 14a through 14n respectively disposed with the plurality of roadway lights 16. At least one or each of the plurality of CSI access points (AP) 14a through 14n may include the processor 104, the memory 106, the antenna controlling circuit 110, and the timer circuit 108 mentioned above, and each of the plurality of CSI AP 14a through 14n includes a transceiving circuit being the same as the transceiving circuit 112. The detection sequences of the plurality of CSI AP 14a through 14n need to be arranged such that interference can be avoided.

In the embodiment, FIG. 4B provides a flow of the structure detection method adapted to the plurality of CSI AP 14a through 14n, which includes the following steps:

In step S401, assigning multiple indices to the plurality of CSI APs 14a through 14n, such as index 0, 1, 2, ..., n−1.

In step S402, setting operation bandwidths, communication powers, and communication directions according to the positions and the indices of the plurality of CSI APs 14a through 14n. The configurations of these parameters may be automatically set by the processor 104, or manually set by users through a user interface equipped along with any one of CSI APs, such that the detections are performed to cover all regions of the structure 12.

In step S403, configuring the timer circuit 108 to provide a counter number i to be started from 0, and selecting the CSI APs with indices i and i+1. The timer circuit 108 is also configured to determine whether a value of i is smaller than a value of n−2. If not, the method proceeds to step S404, and the detection is ended. If yes, the method proceeds to step S405.

In step S405, configuring the processor 104 to control the selected CSI APs with indices i and i+1 to perform the first TR test and the second TR test by executing the detection algorithm mentioned in the previous embodiments. In this case, the CSI AP with index i serves as the first transceiver 12, i.e., CSI AP 14-1, and the CSI AP with index i+1 serves as the second transceiver 11, i.e., CSI AP 14-2.

In step S406, storing the indices, detection time, the obtained CSIs of the CSI APs associated with the current detection in the memory 106.

In step S407, configuring the processor 104 to compare a combination of the obtained CSIs to a reference CSI for detecting anomalies associated with the structure 12. The comparison may be performed according to the flow chart illustrated in FIG. 3 mentioned above.

After step S407, the method may further proceed to step S408, configuring the processor 104 to determine whether anomaly associated with the structure 12 is detected. If yes, the process flow may optionally proceed to step S410, in which the antenna controlling circuit 110 is configured to change or retry at least one of an operation bandwidth, a communication power, and a communication direction of the transceivers of the selected CSI APs associated with the current detection. For the purpose of double checking the anomaly, the sensitivity of the detection utilized TR test may be increased by increasing the operation bandwidth, increasing the communication power, or changing the communication direction of the transceivers of the selected CSI APs toward to the anomaly. After step S408, or if anomaly associated with the structure 12 is not detected in step S408, the method may further proceed to step S409.

In step S409, configuring the timer circuit 108 to change the counter number i by adding value of 1, and the CSI APs with indices i and i+1 are selected. The timer circuit 108 is also configured to determine whether a value of i is smaller than a value of n−2. If not, the method proceeds to step S411, and the detection is ended. If yes, the method returns to step S405. It should be noted that the process of FIG. 4B would be executed by CSI APs itselves. The detected anomaly result, if any, would be stored in the memory 106. Engineering staff may access the stored anomaly result, via the data accessible interface 108 to discover where the anomaly happened.

The reference "Indoor Global Positioning System with Centimeter Accuracy Using Wi-Fi in IEEE Signal Processing Magazine, vol. 33, no. 6, pp. 128-134, November 2016, presented by C. Chen, Y. Han, Y. Chen and K. J. R. Liu" provides a time-reversal method for indoor localization that achieves centimeter accuracy with a single pair of off-the-shelf Wi-Fi devices. With the exploitation of the inherent frequency and spatial diversities in Wi-Fi systems, the method is capable of creating a large effective bandwidth to enable centimeter accuracy. Extensive experiment results in an environment show that the centimeter accuracy as well as robustness against dynamics can be simultaneously achieved with a large effective bandwidth. The literature formulates a large effective bandwidth by exploiting diversities on Wi-Fi devices to facilitate centimeter accuracy localization while inducing the time-reversal process.

In this regard, the operation bandwidth may be increased during the first TR test and the second TR test by the antenna controlling circuit 110 to improve the accuracy of the detection. Moreover, the communication power and the communication direction of the transceivers may be adjusted for further confirming that the anomalies associated with the structure 12 are correctly detected.

Figure 5A:
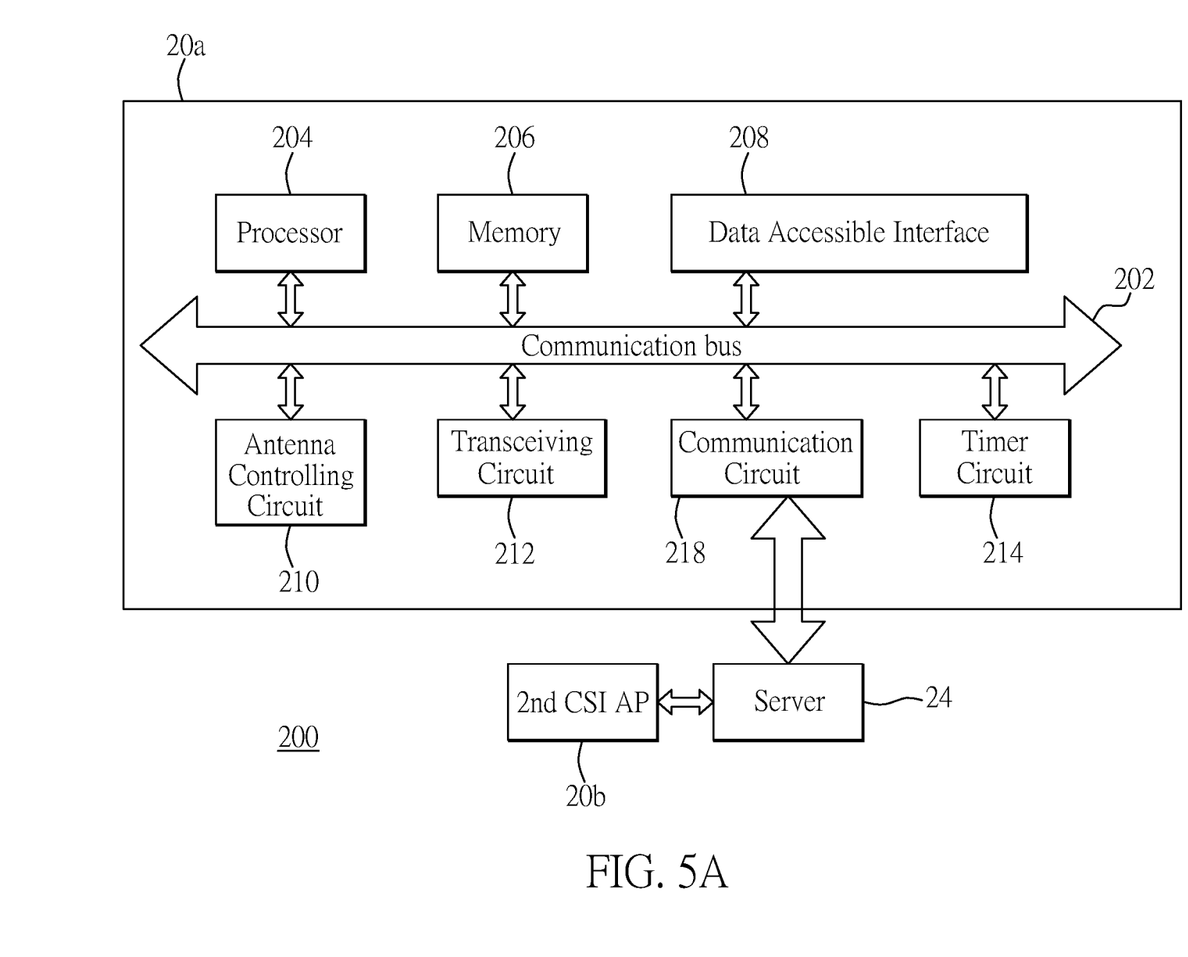
FIG. 5A shows a diagram of a structure detection system according to another embodiment of the present disclosure.
Figure 5B:
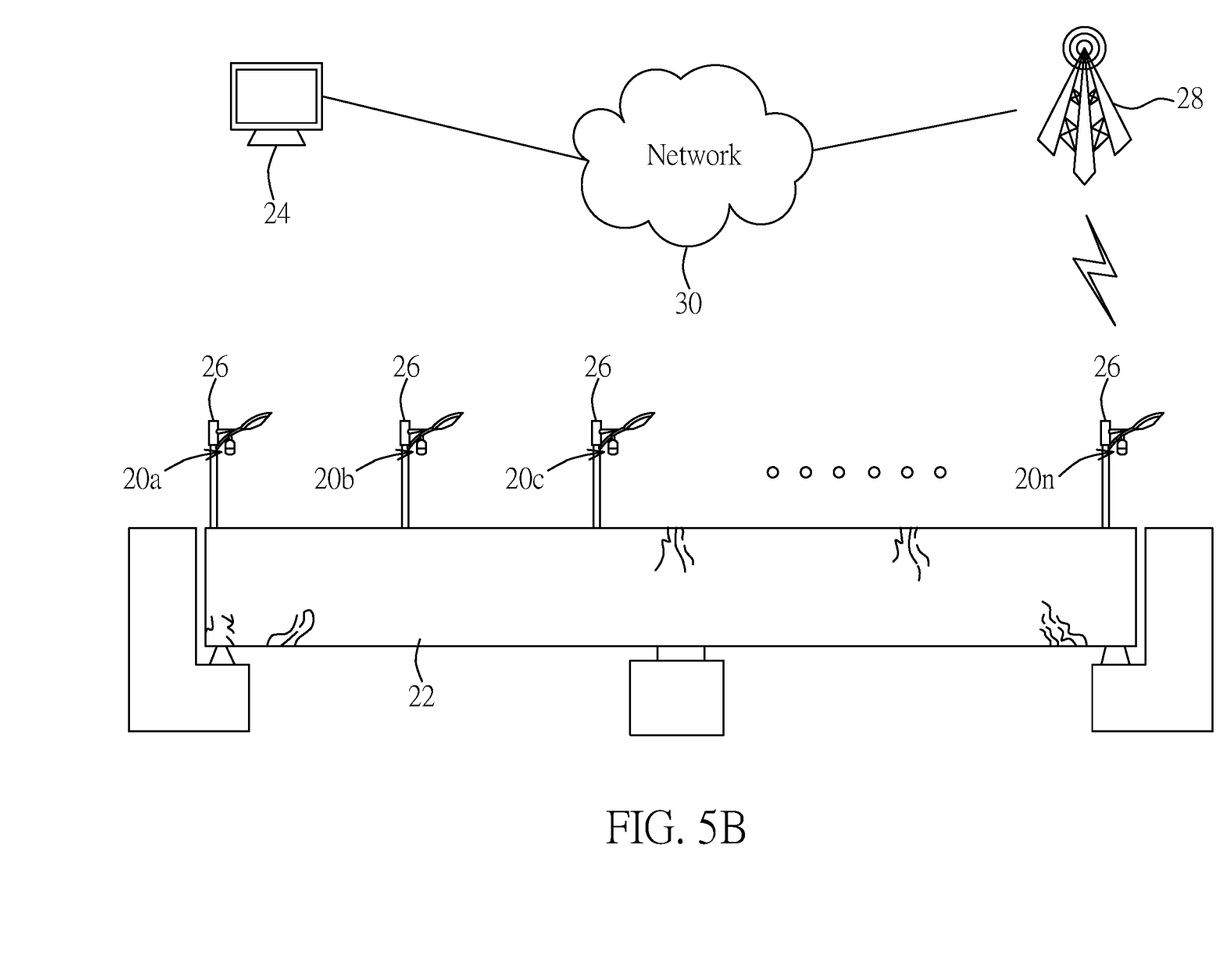
FIG. 5B shows a schematic diagram of the structure detection system according to another embodiment of the present disclosure.

Referring more particularly to the drawings, another embodiment of the disclosure may be described in the context of the structure detection system as shown in FIGS. 5A and 5B.

FIG. 5A shows a diagram of a structure detection system according to another embodiment of the present disclosure, and FIG. 5B shows a schematic diagram of the structure detection system according to another embodiment of the present disclosure. In this illustrative example, the structure detection system 200 includes a first CSI AP 20a, a second CSI AP 20b, and a server 24. The first CSI AP includes a communications bus 202, which provides communications between a processor 204, a memory 206, a data accessible interface 208, an antenna controlling circuit 210, a transceiver 212, a communication circuit 218, and a timer circuit 214. The first CSI AP 20 communicates with the server 24 through the communication circuit 218. The processor 204, the memory 206, the data accessible interface 208, the antenna controlling circuit 210, the transceiver 212 and the timer circuit 214 are similar to their counterparts in the previous embodiments, so that details thereof are omitted herein. Furthermore, the second CSI AP 20b is configured to be the same as the first CSI AP 20a. Although the figure merely provides two CSI APs, the number of the CSI APs may be plural, such as the third CSI AP 20c through the $n^{th}$ CSI AP 20n as depicted in FIG. 5B.

The communications circuit 218, in these examples, provides for communications with other data processing systems or devices, such as the server 24. In these examples, the communications circuit 218 may be a backhaul communication circuit that supports Wide Area Network (WAN), which can transmit signal via 2G, 3G, LTE, 5G and etc. The communications circuit 218 may provide communications through the use of either or both physical and wireless communications links.

The server 24 may be inherently provided with the processor, the memory, the antenna controlling circuit, and the timer circuit being similar to those in the first CSI AP 20a. The server 24 may include only a processor for controlling the first CSI AP 20a through the communication circuit 218. Specifically, the server 24 may be configured to perform the detection algorithm for detecting anomalies associated with the structure, as illustrated in the flow chart of FIG. 3.

Specifically, the data accessible interface 208, such as USB interface, may be provided for user to access data stored in the memory 206. In certain embodiment, the data may include the detection algorithm, communication parameters, reference CSIs, current CSIs associated with the detections, those may be manually accessed by the user for analyzing time reversal responses to detect structural health and test for anomalies associated with structures, if one or more components are failed in the system. For example, if the communication circuit 218 is unable to establish the communication with the server 24, or the server 24 is failed, the user may manually access the data for analyzing time reversal responses to detect structural health and test for anomalies associated with structures, according to the process provided in FIG. 3.

As shown in FIG. 5B, a structure 22, such as a bridge, is provided with a plurality of CSI access points (AP) 20a through 20n respectively disposed with the plurality roadway lights 26. The plurality of CSI access points (AP) 20a through 20n may each include the same configuration as the first CSI AP 20a. The detection sequences of the first CSI AP 20a through the $n^{th}$ CSI AP 20n need to be arranged such that interference can be avoided.

Similarly, the first CSI AP 20a through the $n^{th}$ CSI AP 20n may be respectively disposed at positions adjacent to the roadway lights 26, or attached to the roadway lights 26, in order to share the electrical power. Moreover, the first CSI AP 20a through the $n^{th}$ CSI AP 20n may connect to a base station 28, in order to communicate with the server 24 through the network 30.

In these examples, trigger sequences, trigger timing, trigger periods, operation bandwidth, communication powers, communication directions associated to the first TR test and the second TR test mentioned above, may be controlled and assigned by the server 24.

Figure 5C:
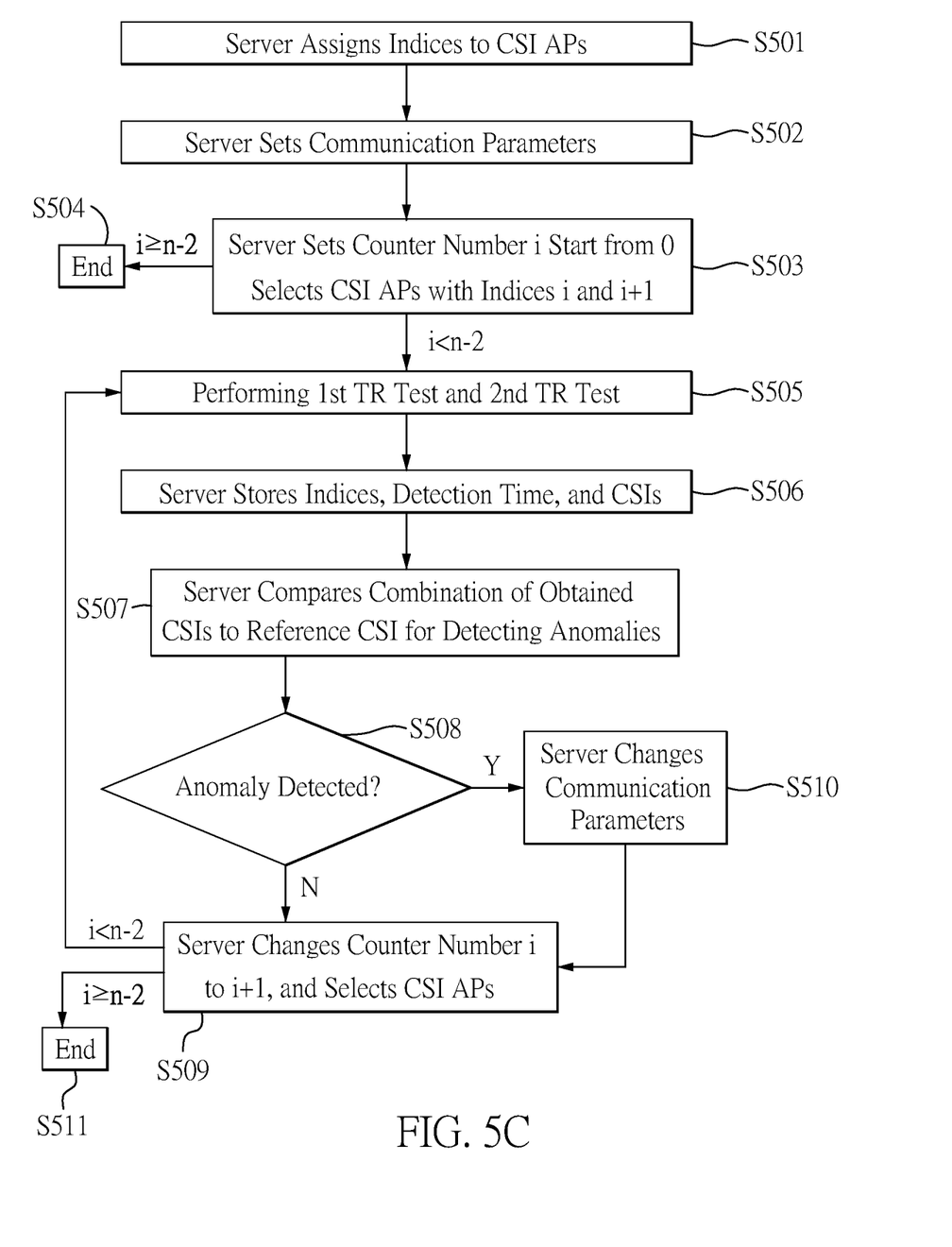
FIG. 5C shows a flow chart of the structure detection method according to embodiments of the present disclosure.

Another embodiment of the structure detection method will be described with reference to FIG. 5C. FIG. 5C shows a flow chart of the structure detection method according to embodiments of the present disclosure. The method includes the following steps.

In step S501, configuring the server 24 to assign multiple indices to the first CSI AP 20a through the $n^{th}$ CSI AP 20n, such as index 0, 1, 2, . . . , n−1. Once the indices for the first CSI AP 20a through the $n^{th}$ CSI AP 20n are assigned, each of the regions covered by two of the first CSI AP 20a through the $n^{th}$ CSI AP 20n may be assigned to a specific detection process to be performed afterward.

Step S502, configuring the server 24 to set operation bandwidths, communication powers, and communication directions according to the positions and the indices of the first CSI AP 20a through the $n^{th}$ CSI AP 20n. The configurations of these parameters may be automatically set by the server 24, or manually set by the users through a user interface equipped along with the server 24, such that the detections are performed to cover all regions of the structure 22.

In step S503, configuring the server 24 to respectively control the timer circuits in the first CSI AP 20a through the $n^{th}$ CSI AP 20n to provide a counter number i to be started from 0, and the CSI APs with indices i and i+1 are selected. Alternatively, the server 24 may be configured to control the timer circuit inherently provided in the server 24. The server 24 is further configured to control the timer circuits to determine whether a value of i is smaller than a value of n−2. If not, the method proceeds to step S504, and the detection is ended. If yes, the method proceeds to step S505.

In step S505, configuring the server 24 to control the selected CSI APs with indices i and i+1 to perform the first TR test and the second TR test by executing the detection algorithm mentioned in the previous embodiments. In this case, the CSI AP with the index i may serve as the first transceiver 10, i.e., the first CSI AP 14-1, and the CSI AP with index i+1 may serve as the second transceiver, i.e., the second CSI AP 14-2, as depicted in the previous embodiments. After the first TR test and the second TR test are performed, the obtained CSIs are transmitted to the server 24 via the network 30.

In step S506, configuring the server 24 to store the indices, detection time, the obtained CSIs of the CSI APs associated with the current detection in the memories provided in the server 24. The CSIs may be obtained by the processor in each of the first CSI AP 20a through the $n^{th}$ CSI AP 20n, and then be transmitted to the server 24 through the network 30.

In step S507, configuring the server 24 to compare a combination of the obtained CSIs to a reference CSI for detecting anomalies associated with the structure 12. The comparison may be performed according to the flow chart illustrated in FIG. 3 mentioned above. In the embodiments, the positions of the cracks, if detected, may be confirmed according to the indices assigned to the first CSI AP 20a through the $n^{th}$ CSI AP 20n.

After step S507, the method may further proceed to step S508, configuring the server 24 to determine whether anomaly associated with the structure 22 is detected. If yes, the process flow may optionally proceed to step S510, in which the server 24 is configured to control the antenna controlling circuit 210 to change or retry at least one of an operation bandwidth, a communication power, and a communication direction of the transceivers of the selected CSI APs associated with the current detection. For the purpose of double checking the anomaly, the sensitivity of the detection utilized TR test may be increased by increasing the operation bandwidth, increasing the communication power, or changing the communication direction of the transceivers of the selected CSI APs toward to the anomaly. After step S510, or if anomaly associated with the structure 12 is not detected in step S408, the method may further proceed to step S509.

In step S509, configuring the server 24 to control the timer circuit(s) to change the counter number i by adding a value of 1, and selecting the CSI APs with indices i and i+1. The server 24 is also configured to control the timer circuit(s) to determine whether a value of i is smaller than a value of n−2. If not, the method proceeds to step S511, and detection is ended. If yes, the method returns to step S505.

Similarly, the operation bandwidth may be increased during the first TR test and the second TR test by the antenna controlling circuit to improve the accuracy of the detection. Moreover, the communication power and the communication direction of the transceivers may be adjusted for further confirming that the anomalies associated with the structure 22 are correctly detected.

From above, the present disclosure provides a structure detection system and method that detect anomalies associated with the structure by obtaining channel state information from the time-reversal process, without contacting the structure. By executing the detection algorithm, the accuracy and latency of distance calculation can be significantly enhanced by using CSI while detecting anomalies associated with the structure.

Furthermore, in the embodiments of the present disclosure, the positions of the cracks, if detected, may be confirmed according to the indices assigned to the CSI APs, and the operation bandwidth may be increased during the first TR test and the second TR test by the antenna controlling circuit to improve the accuracy of the detection. The communication power and the communication direction of the transceivers may be adjusted for further confirming that the anomalies associated with the structure are correctly detected.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which includes one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The description of the different exemplary embodiments has been presented for purposes of illustration and description, and is not intended to be exhaustive or limited to the disclosure in the form disclosed. Many modifications and variations will be apparent to those of ordinary skill in the art. Further, different exemplary embodiments may provide different advantages as compared to other exemplary embodiments. The embodiment or embodiments selected are chosen and described in order to best explain the principles of the disclosure, the practical application, and to enable others of ordinary skill in the art to understand the disclosure for various embodiments with various modifications as are suited to the particular use contemplated.

What is claimed is:

1. A structure detection system, comprising:
   a first transceiver;
   a second transceiver, communicating with the first transceiver to detect a structure, wherein in a first time-reversal (TR) test, the first transceiver is configured to send a first probing signal, the second transceiver is configured to receive the first probing signal and to perform a time-reversal (TR) process to generate a first time-reversal (TR) signal to be sent to the first transceiver, and the first transceiver is configured to obtain a first channel state information (CSI) in response to the first time-reversal (TR) signal, and wherein in a second time-reversal (TR) test, the second transceiver is configured to send a second probing signal, the first transceiver is configured to receive the second probing signal and to perform the TR process to generate a second time-reversal (TR) signal to be sent to the second transceiver, and the second transceiver is configured to obtain a second CSI in response to the second TR signal; and
   a processor provided in the first transceiver, the second transceiver or a server and configured to compare a combination of the first CSI and the second CSI to a reference CSI for detecting anomalies associated with the structure,
   wherein the first CSI, the second CSI and the reference CSI are each represented by a CSI matrix H, wherein H=[H1, H2, ..., Hn], where H1, H2, ..., Hn are components each including an amplitude and a phase of each of a plurality of subcarriers;
   wherein the processor is further configured to execute a detection algorithm to compare an average amplitude matrix HA of the first CSI and the second CSI to an average reference amplitude matrix HS of the reference CSI for detecting anomalies associated with the structure;
   wherein HA=[(‖H11‖+‖H12‖)/2, (‖H21‖+‖H22‖)/2, ..., (‖Hn1‖+‖Hn2‖)/2], where ‖H11‖, ‖H21‖, ..., ‖Hn1‖ are amplitudes of each of the plurality of subcarriers obtained in the first CSI, and ‖H12‖, ‖H22‖, ‖Hn2‖ are amplitudes of each of the plurality of subcarriers obtained in the second CSI, and wherein HS=[‖Havg1‖, ‖Havg2‖, ..., ‖Havgn‖], where ‖Havg1‖, ‖Havg2‖, ..., ‖Havgn‖ are amplitudes of each of the plurality of subcarriers in the reference CSI.

2. The structure detection system according to claim 1, wherein the structure is a bridge.

3. The structure detection system according to claim 1, wherein a number of the plurality of subcarriers of the first CSI is as the same as a number of the plurality of subcarriers of the second CSI and a number of the plurality of subcarriers of the reference CSI.

4. The structure detection system according to claim 1, wherein the processor is further configured to determine whether $\sqrt{\Sigma(HS-HA)^2}$ is larger than a threshold value, and if yes, the anomalies are determined to exist in the structure.

5. The structure detection system according to claim 1, wherein the reference CSI is obtained by performing the first TR test and the second TR test when the structure is without anomalies.

6. The structure detection system according to claim 5, wherein a first time of day for obtaining the reference CSI is substantially the same as a second time of day for obtaining the first CSI and the second CSI.

7. The structure detection system according to claim 1, wherein the processor is further configured to control at least one of a trigger sequence, a trigger timing, and a trigger period associated to the first TR test and the second TR test.

8. The structure detection system according to claim 1, wherein the processor is configured to change at least one of an operation bandwidth, a communication power, and a communication direction of the first transceiver and the second transceiver if an anomaly associated with the structure is detected.

9. A structure detection method, comprising:
   communicating a first transceiver with a second transceiver to detect a structure;
   configuring the first transceiver and the second transceiver to perform a first time-reversal (TR) test, wherein in a first TR test, the first transceiver is configured to send a first probing signal, the second transceiver is configured to receive the first probing signal and to perform a time-reversal (TR) process to generate a first TR signal to be sent to the first transceiver, and the first transceiver is configured to obtain a first channel state information (CSI) in response to the first TR signal;
   configuring the first transceiver and the second transceiver to perform a second TR test, wherein in the second TR test, the second transceiver is configured to send a second probing signal, the first transceiver is configured to receive the first probing signal and to perform the TR process to generate a second TR signal to be sent to the second transceiver, and the second transceiver is configured to obtain a second CSI in response to the second TR signal;
   configuring a processor provided in the first transceiver, the second transceiver or a server to compare a combination of the first CSI and the second CSI to a reference CSI for detecting anomalies associated with the structure, wherein the first CSI, the second CSI and the reference CSI are each represented by a CSI matrix H, wherein H=[H1, H2, ..., Hn], where H1, H2, ..., Hn are components each including an amplitude and a phase of each of a plurality of subcarriers; and
   configuring the processor to execute a detection algorithm to compare an average amplitude matrix HA of the first CSI and the second CSI to an average reference amplitude matrix HS of the reference CSI for detecting anomalies associated with the structure;

wherein HA=[(‖H11‖+‖H12‖)/2, (‖H21‖+‖H22‖)/2, . . . , (‖Hn1‖+‖Hn2‖)/2], where ‖H11‖, ‖H21‖, . . . , ‖Hn1‖ are amplitudes of each of the plurality of subcarriers obtained in the first CSI, and ‖H12‖, ‖H22‖, . . . , ‖Hn2‖ are amplitudes of each of the plurality of subcarriers obtained in the second CSI, and wherein HS=[‖Havg1‖, ‖Havg2‖, . . . , ‖Havgn‖], where ‖Havg1‖, ‖Havg2‖, . . . , ‖Havgn‖ are amplitudes of each of the plurality of subcarriers in the reference CSI.

10. The structure detection method according to claim 9, wherein a number of the plurality of subcarriers of the first CSI is as the same as a number of the plurality of subcarriers of the second CSI and a number of the plurality of subcarriers of the reference CSI.

11. The structure detection method according to claim 9, wherein the processor is further configured to determine whether $\sqrt{\Sigma(HS-HA)^2}$ is larger than a threshold value, and if yes, the anomalies are determined to exist in the structure.

12. The structure detection method according to claim 9, further comprising:
obtaining the reference CSI by performing the first TR test and the second TR test when the structure is without anomalies.

13. The structure detection method according to claim 9, wherein an operation time of day for obtaining the reference CSI is as the same as a test time of day for obtaining the first CSI and the second CSI.

14. The structure detection method according to claim 13, further comprising:
configuring the processor to control at least one of a trigger sequence, a trigger timing, and a trigger period associated to the first TR test and the second TR test.

15. The structure detection method according to claim 9, further comprising:
configuring the processor to change at least one of an operation bandwidth, a communication power, and a communication direction of the first transceiver and the second transceiver if an anomaly associated with the structure is detected.

* * * * *